United States Patent Office 3,467,066
Patented Sept. 16, 1969

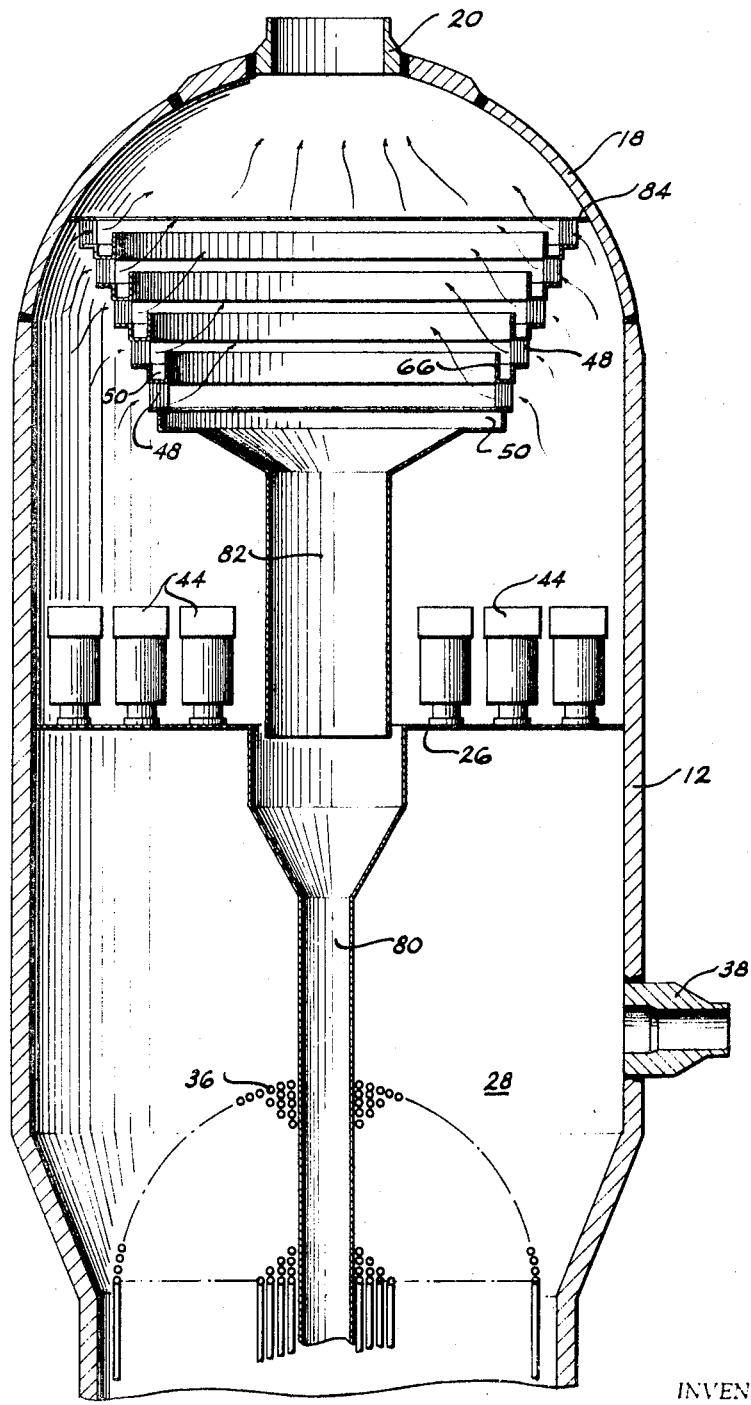
FIG·5

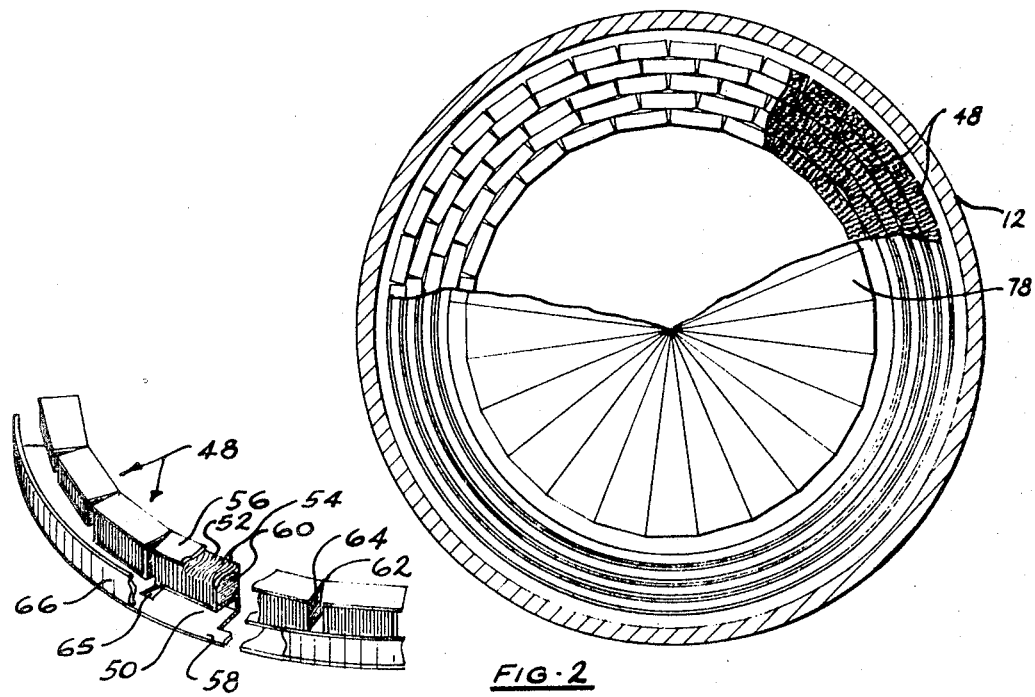
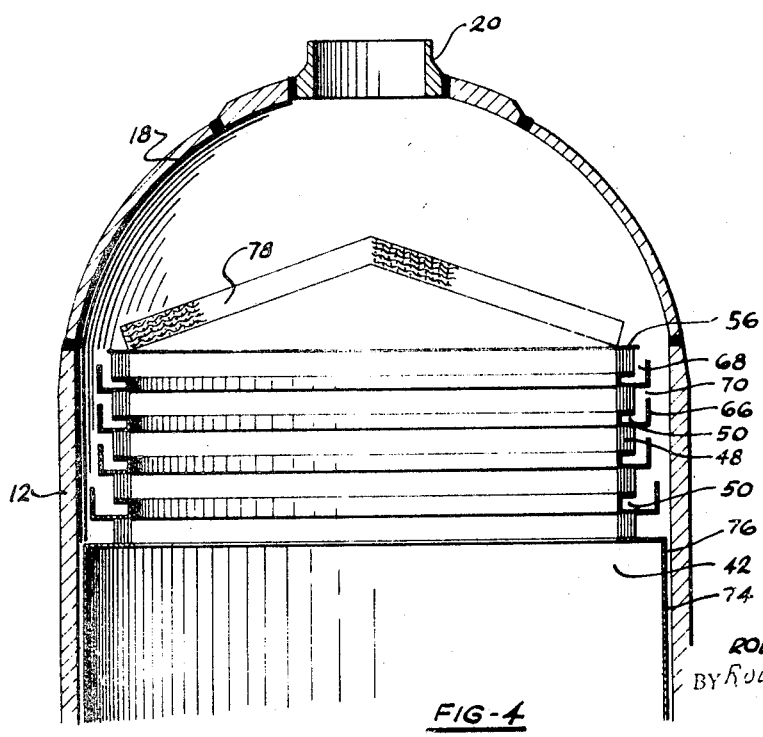

3,467,066
STACK DRIER FOR SHELL AND TUBE
VAPOR GENERATOR
Robert C. Patterson, Suffield, and Rudolph J. Micheller, East Granby, Conn., assignors to Combustion Engineering, Inc., Windsor, Conn., a corporation of Delaware
Filed Dec. 29, 1966, Ser. No. 605,736
Int. Cl. F22b 1/02; B01d 53/26
U.S. Cl. 122—34                                       9 Claims

ABSTRACT OF THE DISCLOSURE

A drier assembly for a shell and tube type vapor generator wherein the drier units, consisting of rectangular casings containing closely spaced corrugated plates, are disposed in annular tiers stacked upon one another to provide a sufficient amount of drier surface within a limited amount of vessel space. Drain channels are interposed between each tier of driers to receive liquid discharged therefrom. The channels are vertically connected in series by means of vertical spaces provided between adjacent drier units such that liquid discharged from each drier tier can be segregated from separated vapor while being returned to the evaporation section of the generator.

Background of the invention

The present invention relates to shell and tube type vapor generators. More particularly, the invention relates to a novel vapor drier assembly for use in shell and tube type vapor generators.

In the generation of electricity by vapor-operated turbines it is necessary that the vapor passed to the turbine be in a dry state, that is, free of any entrained liquid. The drying of vapor is normally conducted in the vapor-containing portion of the vapor generator, be it the vapor drum of a drum type vapor generator or the vapor space of a shell and tube type unit. Apparatus commonly employed for this purpose include centrifugal or turbo-separators, screen driers and corrugated plate driers. In some vapor generators liquid-vapor separation may also be effected merely by means of gravity by providing sufficient space within which the entrained liquid can agglomerate into larger particles and then simply drop from entrainment in the vapor. In most instances more than one type of apparatus are employed in combination in order to obtain vapor of adequate dryness.

No matter what form of separating apparatus is employed, particular care must be taken to prohibit the re-entrainment of liquid in the vapor stream after separation has occurred. For this reason it has been the practice to limit the number of separators mounted in a vapor space to that which will prevent overcrowded conditions from occurring and thereby prevent re-entrainment of separated liquid and vapor. Or, to state it in another way, the space provided for containing the separation equipment is made sufficiently large for containment of adequate amounts of separation apparatus together with sufficient space to prevent re-entrainment of vapor and liquid after separation has once occurred. Thus, when it became desirable to construct vapor generators of increased capacity it was necessary to increase the physical size of the vapor containment space in these units in order to permit the installation of more separating equipment. Such a size increase naturally resulted in an increase in the over-all size of the vapor generators with the concomitant increase in cost of construction and floor space requirements. This problem is even more acute in shell and tube type vapor generators where a principal design consideration is compactness of form. In many applications, such as nuclear power plants, it is desirable to employ shell and tube type units that are vertically oriented in order to reduce the size of the containment structure required to house the plant. However, in order to maintain the dimensions of the shell within the bounds of economic practicality, the area available for mounting separating equipment must be kept to a minimum. This then has imposed a limitation on the generating capacity of such units. It is to the alleviation of this problem that the present invention is directed.

Summary of the invention

It is an object of the invention to provide means for increasing the number, and thereby the separating capacity, of vapor separating equipment within the vapor separator of vertically oriented shell and tube type vapor generators. The increase in separating capacity is accomplished with no accompanying danger of re-entrainment of liquid and vapor after separation has taken place. According to the invention a drier assembly is provided wherein the drier units, comprising in the preferred embodiment rectangular casings containing corrugated plates, are disposed in stacked, annular tiers about the periphery of the vapor space. Between each tier of driers annular drain channels are provided to receive the liquid separated from the vapor-liquid mixture in the driers of the superadjacent tier and all higher tiers. Means in the form of spaces between each drier unit serve to vertically connect each of the drain channels in series such that liquid can be isolated from the separated vapor flowing within the vessel while the former is being returned to the evaporation chamber.

Content of the drawings

FIGURE 2 is a section taken along line 2—2 of FIGURE 1;

FIGURE 3 is a partial perspective illustrating the drier units in greater detail;

FIGURE 4 is a partial vertical section of a modified embodiment of the invention; and FIGURE 5 is a partial vertical section of another modified embodiment of the invention.

Description of the preferred embodiments

Figure 1:
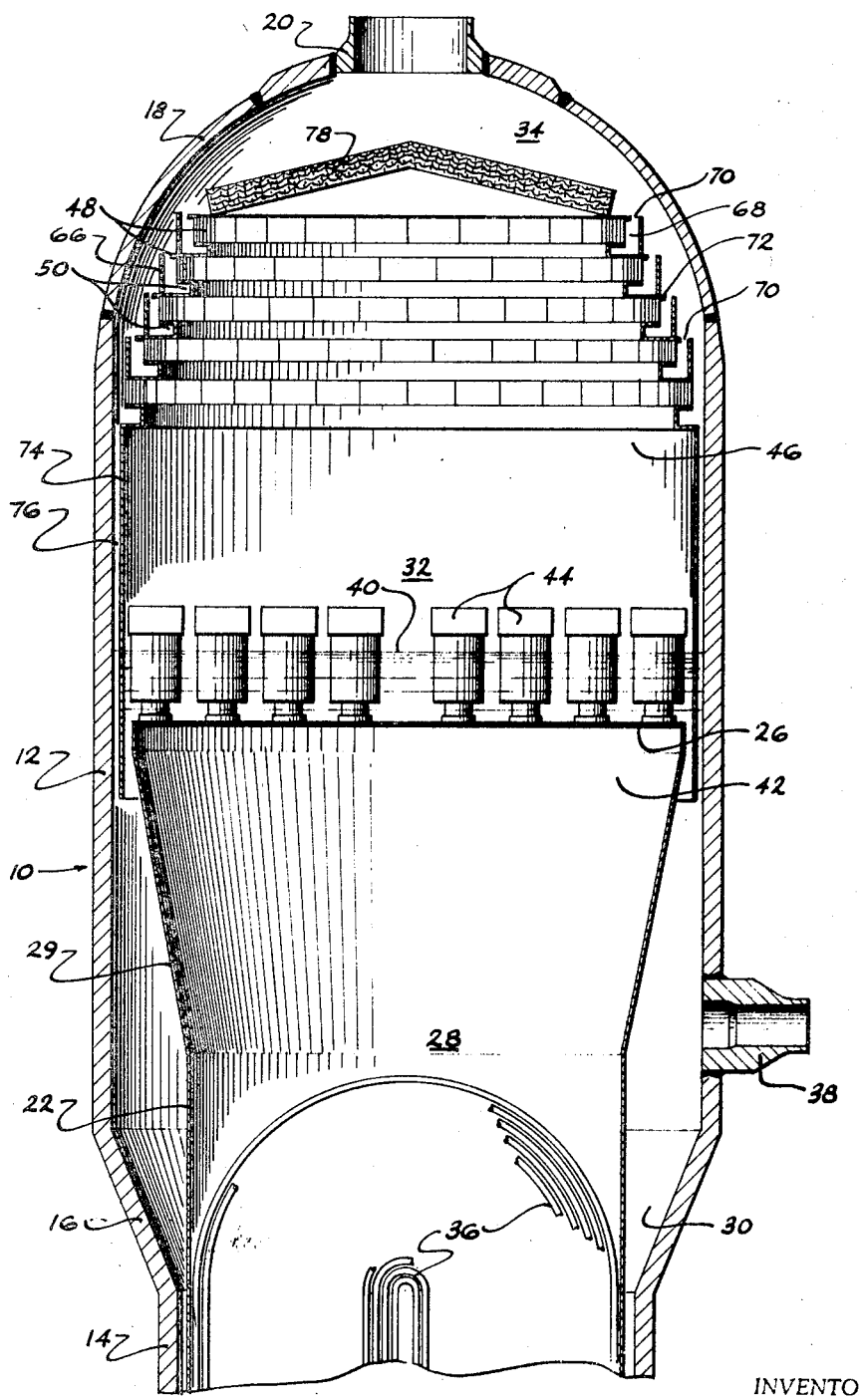
FIGURE 1 is a partial vertical section of a shell and tube type vapor generator incorporating one form of the invention.

In FIGURE 1 of the drawings the numeral 10 represents the upper portion of a shell and tube type vapor generator similar to that disclosed in U.S. Patent No. 3,286,696 but constructed in accordance with the present invention. The vapor generator 10 comprises a vertically elongated pressure vessel formed by a containment structure that includes a first cylindrical shell 12, and a second cylindrical shell 14 connected to the first by a conical transition member 16. The upper end of the vessel is closed by a hemispherical head 18 having a vapor outlet nozzle 20 therein. The interior of the vessel contains baffle means concentrically spaced from the vessel wall including cylindrical baffle 22, conical baffle 24 and horizontal closure baffle 26 defining an interior evaporation chamber 28. That portion of the vessel that surrounds the baffles 22 and 24 is designated the downcomer passage 30 which communicates with the evaporation chamber 28 at its lower end in a known manner. That portion disposed above the horizontal baffle 26 is designated the separation space 32 and vapor space 34. Within the evaporation chamber 28 is located a tube bundle 36 which is connected to a source of high temperature heating fluid (not shown) in a known manner. Vaporizable liquid such as water is admitted to the vessel interior by means of a feedwater nozzle 38 that penetrates the shell 14 in communication with downcomer passage 30. Water admitted through the feedwater nozzle 38 is mixed with liquid separated by apparatus in the separation space 34 and discharged into the passage 30 to form a body of liquid therein having a level 40. Liquid discharged into the downcomer passage 30 is conducted thereby to the evaporation chamber 28 where heat is transferred from the heating fluid flowing through the tubes of the tube bundle 36 to the liquid transforming some of it into vapor. The vapor produced in the evaporation chamber 28 flows as a vapor-liquid mixture from a collection space 42 at the top of the evaporation chamber into the separation space 32 where the vapor and liquid constituents of the mixture are separated.

The separation space 32 contains vapor separating apparatus that is operative in three stages to effect vapor-liquid separation. The first separation stage involves reducing the liquid content of the mixture received from the mixture collection space 42 by means of a plurality of centrifugal action turbo-separators 44 that are mounted upon the horizontal baffle 26 and communicate with the collection space 42 through openings provided in the baffle. The saparators 44 may be as shown and described in U.S. Patent No. 2,648,397 issued Aug. 11, 1953, to Ravese wherein the liquid removed from the mixture due to spinning is discharged downwardly onto the baffle 26 and thence into the downcomer passage 30 while the vapor that emerges from the separators is passed upwardly into the gravity separation space indicated as 46.

The gravity separation space 46 constitutes the second stage of separation. In this area some of the liquid entrained in the vapor that emerges from the separator 44 is caused to be released from entrainment by the effect of gravity. The liquid so removed falls to the horizontal baffle 26 where it is conducted with the liquid issuing from separators 44 to the downcomer passage 30.

The vapor, in passing from the gravity separation space 46, enters the third separation stage where any liquid particles still entrained in the vapor are removed. This stage comprises an assembly constructed in accordance with the present invention including a plurality of drier units 48 and intermediate drain channels 50 arranged in stacked concentric tiers about the axis of the vessel. As shown in FIGURE 2 each tier comprises a polygonal ring of drier units 48 disposed about the vessel axis and closely spaced from the wall of the vessel. The drier units 48 each comprise a series of closely spaced, corrugated plates 52 arranged side-by-side within a rectangular prismatic casing and forming narrow, sinuous channels 54 extending transversely of the casing. As shown best in FIGURE 3, the casings are closed on top, bottom and opposed sides by plates 56, 58 and 60, respectively, leaving the front and rear sides open for the flow of vapor through the channels 54. The construction of each tier is such that the drier units 48 are disposed in angular relation to one another defining a polygonal ring with the abutting front corners of the casings, here indicated as 62, being joined by means of a continuous weld to form vertically extending spaces 64 between adjacent units that communicate with adjacent channels 50 at both ends. Each of the bottom plates 58 are provided with openings 65 aligned with the spaces 64 to establish communication between adjacent drain channels 50.

The drain channels 50 are formed by annularly disposed plate means located superadjacent each tier of drier units 48 and are adapted to receive liquid discharged therefrom. Annular rear plates 66 are attached to all but the lowermost channel 50 at the outer edge thereof to form drier discharge spaces 68 which, at the bottom includes the channels 50, and at the top, areas to receive discharged dry vapor. The upper ends of the rear plates 66 are spaced from the outer edge of the drier casings to provide openings 70 for the passage of dried vapor from the discharge spaces 68 to the space 34 that encloses the outside of the assembly. Liquid discharged into the channels 50 is removed therefrom by flowing successively to each of the lower compartments through the openings 65 in bottom plates 58 and spaces 64 between adjacent drier units. For this reason, in the preferred embodiment successively lower channels 50 are provided with increasingly deeper dimensions such that the greater volume of liquid flowing in each can be accommodated. The lowermost drain channel 50 is open and has subtended therefrom a cylindrical shroud or skirt 74 which encloses the gravity separation space 46 and is spaced from the vessel wall to form an annular passage 76 that communicates with the downcomer passage 30. Liquid from the lowermost drain channel 50 is conducted through passage 76 to the downcomer passage 30. The skirt 74 is caused to extend to a depth below the liquid level 40 in order to provide a water seal for preventing short circuiting of vapor from the gravity separation space 46 to the passage 76.

A wire mesh screen matting 78 covers the central opening located at the top of the drier assembly. This matting 78, while being operable as a contact drier to remove liquid particles from any vapor that may flow axially of the vessel, has an effective flow area that is considerably less than that provided by the corrugated plate drier units 48 such that all but a minor portion of the vapor will pass radially through the drier units. The matting 78 will, however, function as a vent for the space enclosed by the drier assembly and will operate as a drier for the small portion of vapor that flows therethrough.

The drawings illustrate three embodiments of the present invention. In the embodiment of FIGURE 1 the drier assembly comprises tiers that are stepped from a greatest annular dimension at the bottom to a least annular dimension at the top. The configuration of this embodiment enables it to conveniently conform to the space enclosed by the hemispherical head 18. In this embodiment annular baffle plates 72 may be employed to size the vapor discharge opening 70 in order that a uniform amount of vapor is processed by each drier tier.

In the embodiment of FIGURE 4 the drier assembly possesses tiers of uniform dimension and thereby is adapted for utilization in a cylindrical portion of a vessel.

The embodiment disclosed in FIGURE 5 is adapted for use in a shell and tube vapor generator having a central downcomer passage, here shown at 80, instead of the annular passage 30 in the FIGURES 1 and 4 arrangements. In vapor generators of this type the horizontal baffle 26 which supports the centrifugal separators 44 extends to the wall of the shell 14 such that all of the downcomer liquid flow to the evaporation chamber 28 is through the passage 80. The drier assembly is essentially the same as in the embodiments of FIGURES 1 and 4 with the exception that the drier tiers are stepped from a least annular dimension at the bottom, where the drain channels 50 communicate with a drain passage 82, to a greatest annular dimension at the top. An annular baffle plate 84 attaches between the periphery of the assembly at its top and the shell 14 to direct the flow of vapor from the separators 44 through the drier units 48 radially inwardly toward the axis of the vessel which is the reverse of the direction of flow of vapor through the drier units in the other embodiments.

It will be understood that various changes in the details, materials, and arrangements of parts which have been herein described and illustrated in order to explain the nature of the invention, may be made by those skilled in the art within the principle and scope of the invention as expressed in the appended claims.

What is claimed is:

1. In a vapor generator including a vertically elongated, generally cylindrical vessel, an evaporation chamber in the lower portion of said vessel having means for evaporating liquid admitted thereto by the transfer of heat, the upper portion of said vessel being longitudinally divided into an upper vapor space and a separation space intermediate said vapor space and said evaporation chamber by an assembly of vapor-liquid separators extending transversely of said vessel and operative to separate liquid from the vapor-liquid mixture produced in said evaporation chamber; said assembly comprising:

(a) a plurality of contact driers disposed in axially spaced tiers and having their inlets communicating in common with said separation space for parallel through flow of fluid, each of said driers comprising:
 (i) a substantially closed casing, rectangular in section and open on two laterally opposed sides forming the inlet and discharge sides thereof,
 (ii) means enclosed by said casing for the contact removal of liquid from the vapor-liquid mixture admitted to said drier,
 (iii) means for removing liquid separated from said mixture from the bottom of said discharge side, and
 (iv) means for passing separated vapor upwardly from said discharge side to said vapor space,
(b) means forming axially spaced drain chambers interposed between and being coextensive with adjacent tiers of driers,
(c) means for passing liquid discharged from the driers of each of said tiers to the drain chamber disposed subjacent thereto,
(d) means for vertically connecting each of said drain chambers in series for the confined flow of liquid downwardly to said evaporation space.

2. Apparatus as recited in claim 1 wherein said assembly is annular and concentrically spaced from the wall of said vessel.

3. Apparatus as recited in claim 2 including means forming vertically extending passages between adjacent casings in each tier, said spaces being in open communication at their upper and lower ends with drain chambers located above and below said ring of driers for connecting said chambers in series.

4. Apparatus as recited in claim 3 wherein said casings are connected in a polygonal ring about the axis of said vessel, said connection being made between adjacent corners of said casings to form said spaces.

5. Apparatus as recited in claim 4 wherein said liquid removal means comprise a plurality of side-by-side corrugated plates extending between the supply and discharge sides of said casing and forming narrow tortuous channels through said drier.

6. Apparatus as recited in claim 3 including means forming a generally cylindrical baffle associated with each tier of driers, said baffle being concentrically spaced from the discharge side of said casings and having its lower end forming one side of the subjacent drain chamber and its upper end cooperating with said drier to form an annular vapor discharge space, and means forming an opening for connecting said vapor discharge space with said vapor space.

7. Apparatus as recited in claim 6 wherein said assembly comprises tiers that are stepped from a maximum lateral dimension at the bottom to a minimum dimension at the top.

8. Apparatus as recited in claim 6 wherein said assembly comprises tiers that are stepped from a minimum lateral dimension at the bottom to a maximum dimension at the top.

9. Apparatus as recited in claim 6 wherein said assembly comprises tiers having a substantially uniform lateral dimension.

References Cited

UNITED STATES PATENTS

| | | | |
|---|---|---|---|
| 3,103,206 | 9/1963 | Halvorsen et al. | 122—34 |
| 3,129,697 | 4/1964 | Trepaud | 122—34 |
| 3,133,802 | 5/1964 | Phillips et al. | 55—483 |

KENNETH W. SPRAGUE, Primary Examiner